United States Patent [19]

Seelbach et al.

[11] 3,718,816
[45] Feb. 27, 1973

[54] ILLUMINATION DEVICE

[75] Inventors: Heinz Seelbach, Kierspe; Gerhard Eversberg, Ludenscheid, both of Germany

[73] Assignee: FA. Reininghaus & Co., Ludenscheid, Germany

[22] Filed: June 17, 1971

[21] Appl. No.: 153,980

[30] Foreign Application Priority Data

June 18, 1970 Germany .................... G 70 22 809.0

[52] U.S. Cl. ................. 240/52 R, 174/99, 240/73 R, 240/85 R, 339/22 B
[51] Int. Cl. ........................ F21v 21/00, H01r 13/00
[58] Field of Search ........ 240/52 R, 52 HT, 61, 73 R, 240/73 DA, 73 JC, 78 R, 85 R; 339/21 R, 22 R, 22 T, 22 B, 14 R; 174/99

[56] References Cited

UNITED STATES PATENTS

| | | | |
|---|---|---|---|
| 3,601,748 | 8/1971 | Hart | 339/22 B X |
| 3,559,146 | 1/1971 | Valtoren | 339/14 R |
| 3,546,367 | 12/1970 | Hart | 174/99 B |
| 3,531,758 | 9/1970 | Blunkin | 174/99 B |
| 3,489,981 | 1/1970 | Corl et al. | 174/99 B |
| 3,422,387 | 1/1969 | Sprigings et al. | 339/21 R X |

FOREIGN PATENTS OR APPLICATIONS

| | | | |
|---|---|---|---|
| 957,128 | 5/1964 | Great Britain | 339/22 T |
| 482,329 | 1/1970 | Switzerland | 339/22 B |

*Primary Examiner*—Joseph F. Peters, Jr.
*Attorney*—Ernest G. Montague

[57] ABSTRACT

An illumination device comprising a support rail, a terminal box insertable therein, and receiving on both sides therein a conduit rail carrier having a plurality of electrical conduit rails. A plurality of spring holding and contact-tongues in the terminal box, operatively cooperating with said conduit rails. A pole contact tongue cooperates in one of the insert positions of the terminal box with a pole conduit of one current circuit of one of the conduit rail carriers of one current circuit, while in another insert position turned 180° relative to the first insert position cooperating with the pole conduit of the other current circuit of the other of the conduit rail carriers. The terminal box has in each insert position one grounding pin of two grounding pins cooperating with a grounding rail of the support rail, while the other grounding pin on an opposite side being free from the grounding rail being pressed into the housing of the terminal box, and support rail securing means for a direct securing of the support rail and hook stays for securing of the support rail over suspension profile rails with securing engagement planes of the latter being on a joint level.

6 Claims, 9 Drawing Figures

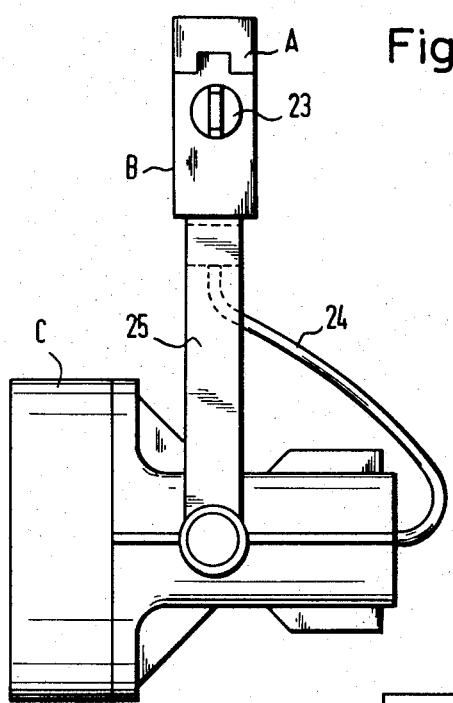
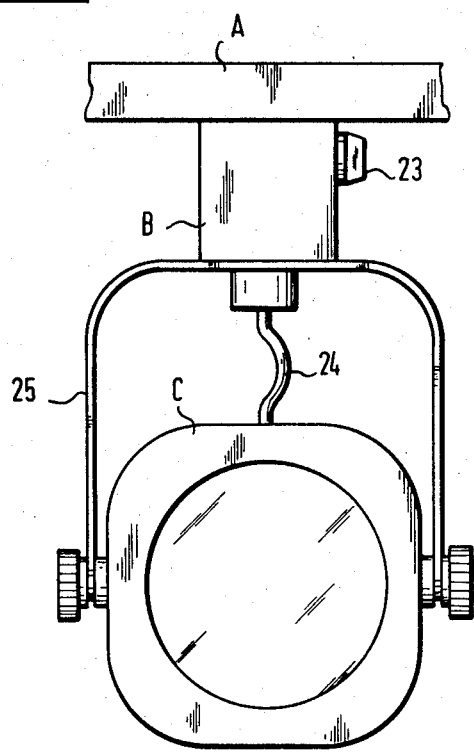

Fig.4
Fig.5
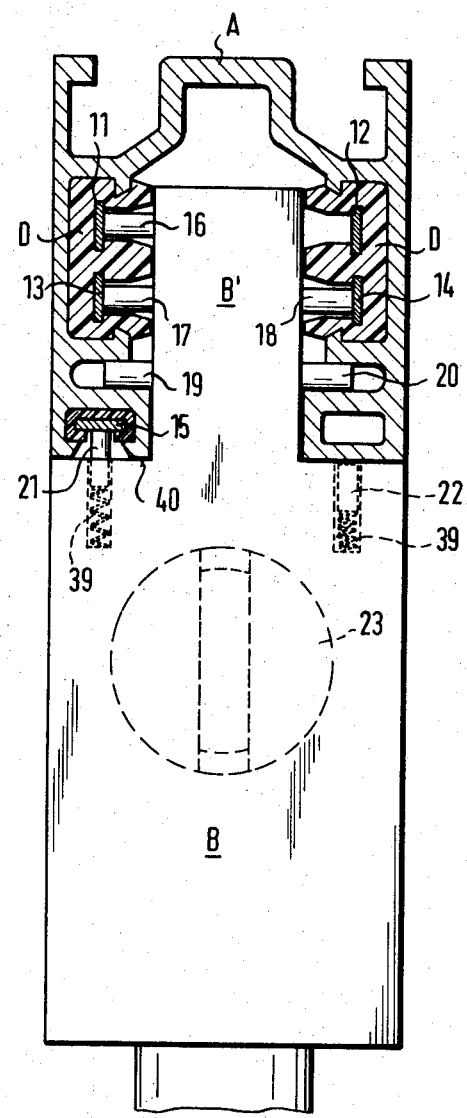
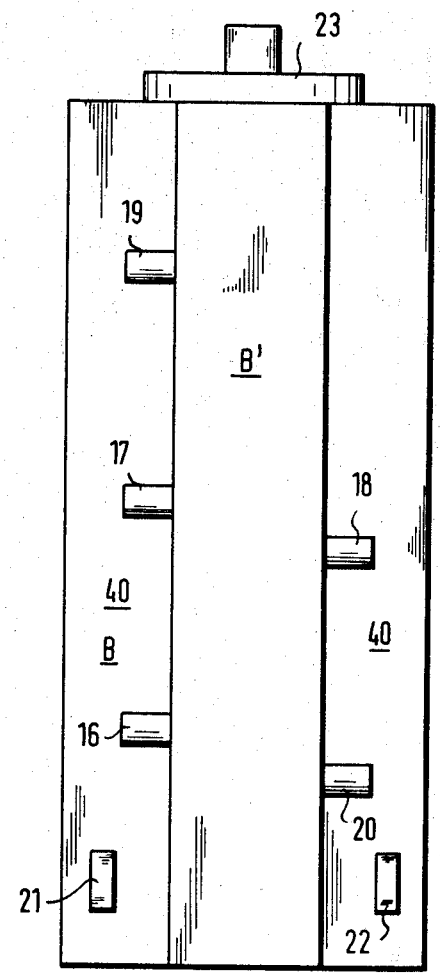

ILLUMINATION DEVICE

The present invention relates to an illumination device comprising, on the one hand, a support rail open towards one side and to be secured in, on or at a distance from a securing face. The support rail receives inside on both sides of a receiving channel of a terminal box, a plurality of electrical conduit rails accessible from the inside and disposed in planes in pairs and mirror-symmetry to a longitudinal center plane provided from the insert side to the securing side of the support rail and superposed relative to each other in a conduit rail carrier. The terminal box, on the other hand, carrys illumination members insertable into the inner space of the support rail, with a set-off head part, which terminal box is equipped with a plurality of spring tongues, as well as with a grounding tongue, and the spring tongues constitute holding- and contact-tongues disposed in planes superposed to each other and switchable by a switching lever, operable from the outside selectively into an engaging and contact position, respectively, or into an inoperative position, as well as a grounding tongue cooperating with its own grounding rail.

In practice, multi-conduit rails of the above stated design with conduit rails disposed set-off relative to each other and arranged inside of the support rails in different planes have already been known.

It is the aim and one object of the present invention, to improve such multi-conduit rails in an advantageous manner, in order to bring the same to a universal use not obtained before.

It is another object of the present invention to provide an illumination device, wherein, on the one hand, conduit rails are provided having a flat rectangular cross section, of each conduit rail carrier of insulating material forming an independent structural unit and held in holding nose grooves of the support rail, as well as embedded approximately over the total cross-sectional width in the support rail pole- and formed as a multi-comb-profile. The pole-and the zero-conduit constitute circuits of their own, switchable and/or controllable independently from each other. On the other hand, the terminal box is insertable into the support rail and is equipped with a pair of zero-conduit tongues each cooperating with the zero conduit rails and arranged corresponding on the terminal box, however, merely with a single pole contact tongue disposed corresponding with the position of the pole rails on the side of the support rails, which in a possible insert position of the terminal box cooperates with the pole rail of one current circuit, on the one side of the receiving channel of the terminal box of the support rail, while this pole contact tongue in a second possible insert position of the terminal box, in which the latter is insertable turned for 180° and extending from a low sided illumination connection to the set-off head part of the terminal box of a longitudinal center axis into the receiving channel of the terminal box of the support rail, cooperates with the pole rail of the other current circuit on the other side of the receiving channel of the terminal box.

Furthermore the terminal box has suitably within the range of its head part having the tongues and the housing part of the terminal box receiving the tongue switching means, a connecting set-off on both sides of the head part, has a spring biased grounding pin providing a grounding connection in each insert position of the terminal box, of which always one in each insert position of the terminal box cooperates in the insert position of the terminal box with a contacting grounding rail received in its own longitudinal channel with insulation on the under side of the support rail. The other grounding pin on the grounding rail free opposite side of the support rail is disposed sunk in the terminal box housing against the pressure of the charge spring. Finally on the side of the upper side of the support rail, support rails securing means, for example, a centrally provided rail stay is arranged for the direct securing of the support rail with the support rail securing means for the indirect securing of the support rail over the suspended profile rail or the like, with their securing engagement plane on a joint level.

By the practical realization of the invention it has been brought about in an advantageous manner, to operate within a multi conduit rail with different current circuits switchable independently from each other and/or controllable. In this arrangement in accordance with the present invention it is decisive only how the terminal box carrying the illumination members is inserted into the rail, in order to cooperate either with one or with another current circuit.

The terminal box to be used in accordance with the present invention has namely only a single pole contact tongue, and is to be used for this reason as a turning terminal box, so that it cooperates in one insert position with its pole contact tongue with the pole rail of the one circuit on the one side of the support rail, while in another insert position, turned for 180° about its longitudinal center axis, it can cooperate with the same pole contact tongue now with the pole rail of the other circuit on the other side of the conduit rail.

This new formation of the support rail and terminal box has in practice, by example, the advantage, that the two circuits operating within the support rail in its effectiveness can be controlled timely independently from each other. As an example, it should be cited, that upon use of such illumination device for a decoration illumination in store windows or the like, those terminal boxes which should be operating only a predetermined time period, for instance, during the evening hours, are connected to the circuit which automatically is switched off upon termination of the pre-set time period. All these terminal boxes, which are supposed to be lit throughout the entire night, are joined in contradiction thereto with a circuit, which is effective over the entire night. It is to be understood that many variations and possibilities can be provided as well as application possibilities with the illumination device of the present invention within the frame work of the circuit operating independently from each other within the same illumination rail.

Seen from the constructive structural side, the support rail in accordance with the present invention can be by example formed such, that adjacent the receiving channel for the terminal box advanced in the center and serving to the direct securing of the support rail there can extend on the upper side a portal-like bridging center stay from the rail center over a part of the width of the rail, angularly bent following thereto in the direction towards the insert side of the terminal box and forms finally a set off as to the and a connecting stay section leading to a hook stay advanced to the level position of the center stay for an indirect securing of the support rail, whereby, between these lateral hook stays and the center stay, a longitudinal channel each, is formed which is open to the securing face, for instance, a cable receiving channel.

In this manner it is possible to use this rail as a completely new rail as to its design, on one side, for a direct securing on a securing face. This would be by example possible within a concealed mounting. On the other side also an outside mounting of the support rail can be performed, if one operates by means of an additional suspension profile or the like, which then can cooperate with the hook stay provided laterally on the support rail profile. The space gained by the arrangement of the support rail between the center stay of the support rail for direct securing and the two lateral hook stays for indirect securing of the support rail can be made useful in an advantageous manner a cable channel for providing connecting conduits or otherwise.

Furthermore, the arrangement of the new support rail is of advantage such, that in the inside of the support rail on each side a pair of stop-nose-hold-stays providing a support nose groove therebetween each are disposed spaced apart from each other and arranged superposed, and projecting from the side wall parts of the support rail profile in cross direction into the inside of the support rail, providing for the holding of a conduit rail carrier each.

In this embodiment it is possible, that the multi-teeth-comb-profile receiving the conduit rails is to be provided in a simple mounting step into these receiving grooves, wherein it is then safely and reliably held. In this connection it is suitable, if each conduit rail carrier is formed as a three-teeth comb profile in its configuration of about E-shape, with the comb teeth reduced towards their free end and is held exclusively within the range of the outer side teeth formed as securing teeth near its free end by form forced stop nose securing means, whereby, within the range between the center and two side teeth the flat rectangular conduit rails are embedded such, that merely a blank rail strand corresponding with the open distance between the comb teeth remains free as a contact path.

Such proposed multi-teeth-comb-profile has appreciable advantages relative to the known conduit rail carrier not only in view of its structure of the holding means of the of rails, but also in relation to its own holding of the support rail itself. This new multi-teeth comb-profile constitutes a completely independent structural unit with built-in conduit rails and can be inserted in a simple manner into the support rail, whereby as due to the structure of the holding of the holder receives a reliable seat such, that the stop holding takes place at the lateral comb teeth near their free ends. Additional holding flanges become superfluous by this new embodiment, whereby it is also far superior over the previously known embodiment.

Furthermore, the new support rail offers also in the following embodiment advantages, since it forms at its lower end on the insert side, on both sides of the insert opening of the terminal box in its profile, a longitudinally extending hollow chamber, of which one is formed as a groove open one-sided downwardly and receiving the grounding rail jointly with grounding rail carrier, and the other chamber is a chamber having break-throughs all around closed in its cross-section and under circumstances having the break-throughs only towards the receiving channel of the terminal box and, whereby furthermore above the chambers longitudinal recesses are provided for the engagement of the holding tongues of the terminal box.

By this arrangement it is warranted that the holding box provided on the terminal box, which serves the purpose to provide the necessary holding for the terminal box within the support rail, can be safe and reliable. On the other side, a grounding rail can be provided advantageously and can be absolutely safely separated from the current feeding rails.

Due to the fact that the terminal box has on both sides a set-off head part on the set-off step a grounding pin each, it is possible to have cooperating in any possible insert position of the terminal box, one of the two grounding pins with the grounding rail.

Finally, it is in accordance with a further proposal of the present invention also of advantage that the conduit rails terminate within the conduit rail carrier at a distance warranting an engagement protection in front of the ends of the conduit rail carrier. With this embodiment the present invention fulfills from the point of view of an engagement protection, the requirements put to such device in excellent manner, so that it is also superior in this aspect over the previously known devices of this type.

With these and other objects in view, which will become apparent in the following detailed description, the present invention, which is shown by example only, will be clearly understood in connection with the accompanying drawings, in which:

FIG. 1 is an end view of an illumination device consisting of a support rail, terminal box and radiant unit;

FIG. 2 is a side elevation of the device turned for 90° compared with the showing in FIG. 1;

FIG. 4 is an end view of the illumination device whereby the terminal box is inserted into the support rail shown in section and cooperating in this position with a circuit;

FIG. 5 is an elevation of the terminal box for the position shown in FIG. 4;

Figure 3:
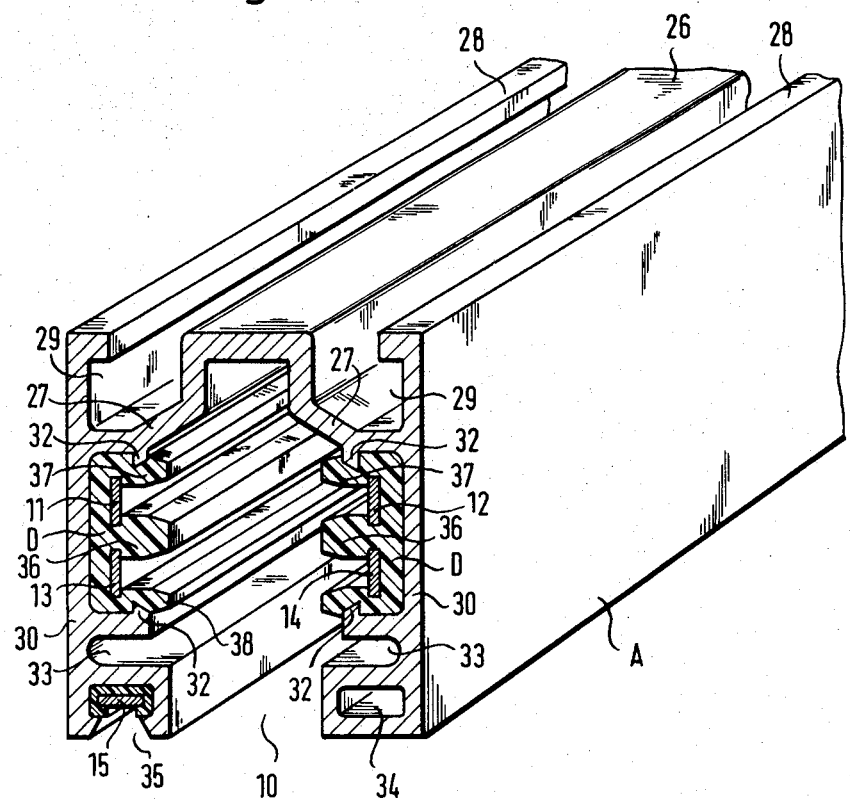
FIG. 3 is a perspective view shown in enlarged scale of the support rail alone.

Referring now to the drawings and in particular to FIGS. 1 to 5, the illumination device comprises substantially three main parts, namely, a support rail A, at least one terminal box B, as well as a radiant unit C, connected with the terminal box B. The support rail A can be secured by securing means (not described in detail herein) to a securing face and has inside a receiving chamber 10 for the terminal box which is formed as a longitudinal channel, and for electrical conduit rails 11, 12, 13, 14 and 15, as is more clearly described below.

Each terminal box B has generally a square like base configuration and is set-off at its end inserted into the hollow space 10 of the support latch A with a formation of a head part B' stepwise set-off as to its width, whereby the head part B' has a narrower width than the main part of the terminal box B. In the terminal box itself there are resiliently disposed contact tongues 16, 17 and 18, on the one hand, as well as holding tongues 19 and 20, on the other hand. On the set-off step 40 of the terminal box B are provided grounding pins 21 and 22.

Of the shown contact tongues, the tongue indicated as tongue 16 is formed as a pole contact tongue and is disposed close to the upper free end of the headpart at one side thereof. This pole contact tongue 16 is provided in the present embodiment by example merely in one embodiment of the terminal box B. In a plane below the pole contact tongues 16 is disposed at the same level on both sides of the head part B' the zero-conduit tongues 17 and 18. At a distance therefrom are arranged the holding tongues 19 and 20. The shown tongues 16 to 20 extend into the inside of the terminal box B and can be operated by means of an endsided switch toggle 23, provided on the terminal box B, such that it can be conveyed for the insertion of the head part B' into the receiving channel 10 of the terminal box back into the head part, while it can enter to the outside in the insert position and cooperate with the individual support rail sided contact as well as engaged into the reception means provided for this purpose. These contact tongues are in connection inside of the terminal box B with a feeder 24 which leads to the radiant unit C, which itself is retained by means of the retaining clip 25 adjustably on the terminal box B.

In connection with the support rail A, the inner space 10 is bridged over at its upper side by a central bridge 26, which extends over one part of the widths of the support rail, is then bent in the direction towards the insert end of the rail and is transformed then to the connecting stay section 27, which in turn is guided back as a hook stay 28 up the level of the center stay 26. By this arrangement the longitudinal channel-like hollow space 29 forms itself, which can serve as cable channel.

Furthermore, inside of the support rail A starting from the side wall parts 30, nose stays 31 are provided, which near their free end have a stop nose 32. Since also the connecting stay sections 27 are formed with such stop nose 32, between the latter, a fold nose groove is formed, which serves for the reception of a conduit rail carrier D of insulating material. Below the nose stay 31 there are arranged recesses 33, which cooperated with the holding tongues 19 and 20 of the terminal box B. In a plane below these recesses 33 forms a support rail A on one side a longitudinal channel 34 and on the other side a recess 35, into which a grounding rail is inserted. The longitudinal channel 34 can be equipped with openings towards the inner space 10 under certain circumstances.

The conduit rail carrier D is formed as with multi-tooth comb profile, whereby the conduit rails 11 and 13 and 12 and 14, respectively, are received within the range between a joint center tooth 36 and two side teeth 37 and 38. They are embedded such, that towards the inner space 10 merely a contact space remains, with which the tongues on the side of the terminal box can cooperate. The side teeth 37 and 38 have, close to their free end, stop recesses, which cooperate with the stop noses 32. The conduit rails 11 and 12, respectively, which are received between the center teeth 36 and the side teeth 37, serve as pole rails, while the conduit rails 13 and 14, respectively, which are received between the center teeth 36 and the other side teeth 38, function as the zero conduit rails. The conduit rail carrier D forms jointly with the conduit rails a structural unit which is independent by itself and can be joined in the insertion process with the support rail A.

Figure 6:
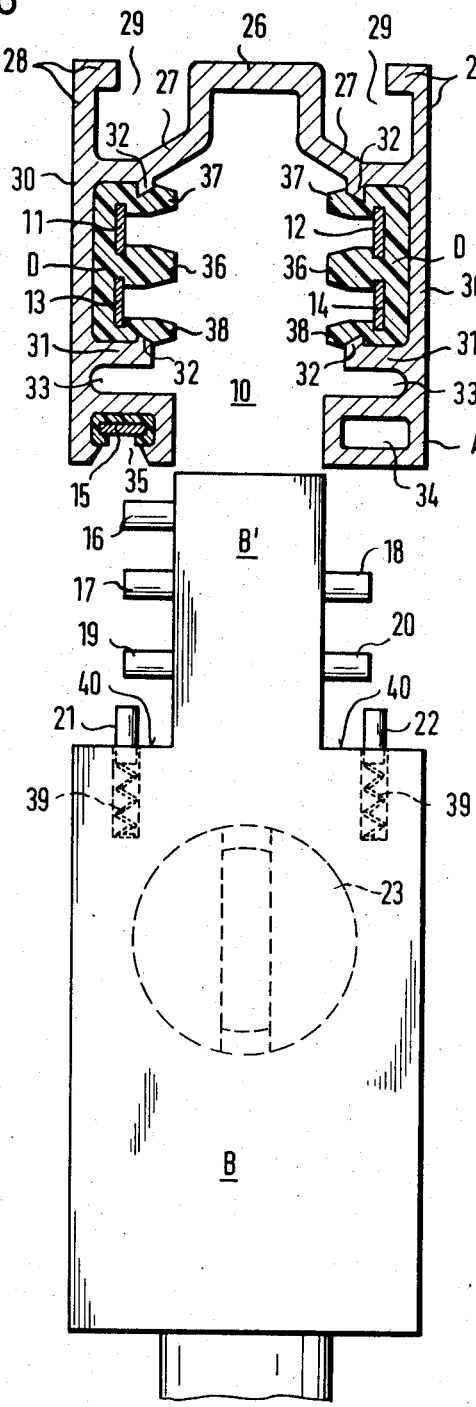
FIG. 6 is a section of the support rail and terminal box of the position shown in FIG. 4, however, in its still non-coupled state.

In FIGS. 4 to 6 an example of the present invention is disclosed. In this embodiment the pole contact tongue 16 of the terminal box B cooperates with the pole rail 11 on the drawing on the left side of the support rail A. In this embodiment the pole rail 11 and the zero conduit rail 13 form a joint circuit. The zero conduit tongues 17 and 18 of the terminal box B operate in this application with the zero conduit rails 13 and 14 of the support rail. The pole rail 12 remains unused in this application. As can be ascertained from FIG. 4, in this application the grounding pin 21 cooperates with the grounding rail 15, while the other grounding pin 22 disappears unused inside of the terminal box against the pressure of the spring 39.

Figure 7:
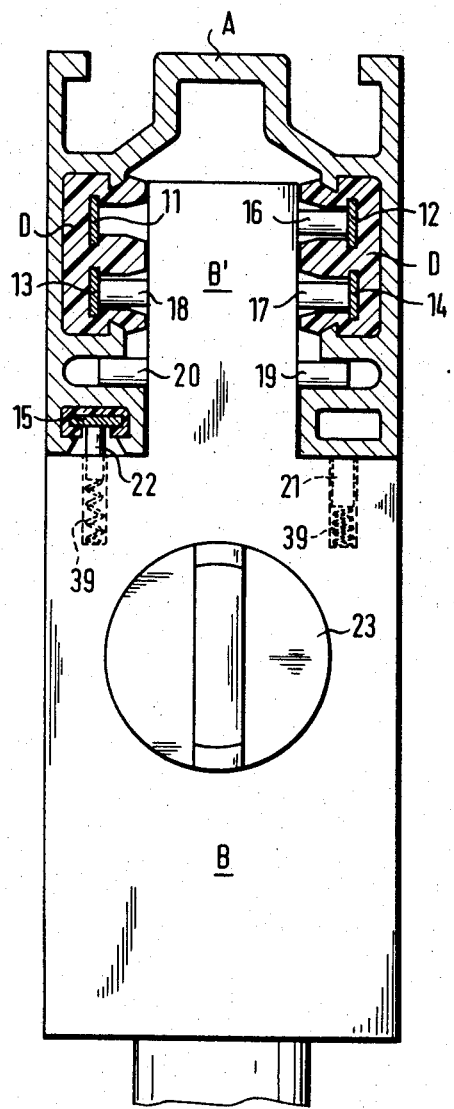
FIG. 7 is an end view partly in section corresponding with FIG. 4, whereby the terminal box cooperates with the circuit on the other side of the support rail shown in section.
Figure 8:
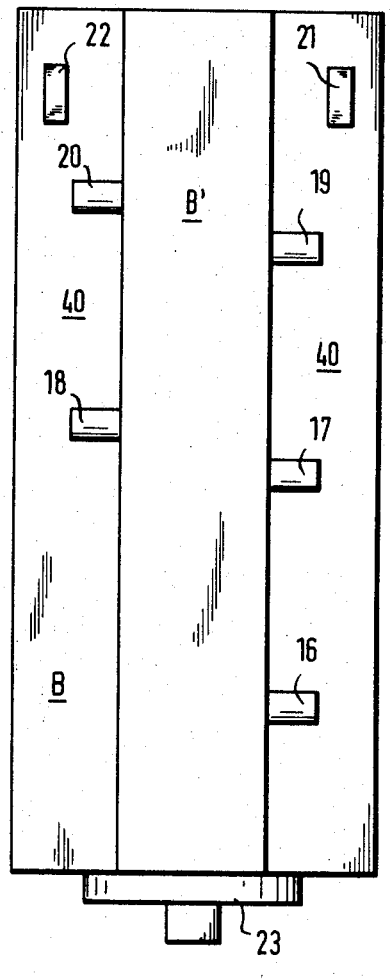
FIG. 8 is an elevation of the terminal box for the position shown in FIG. 7.
Figure 9:
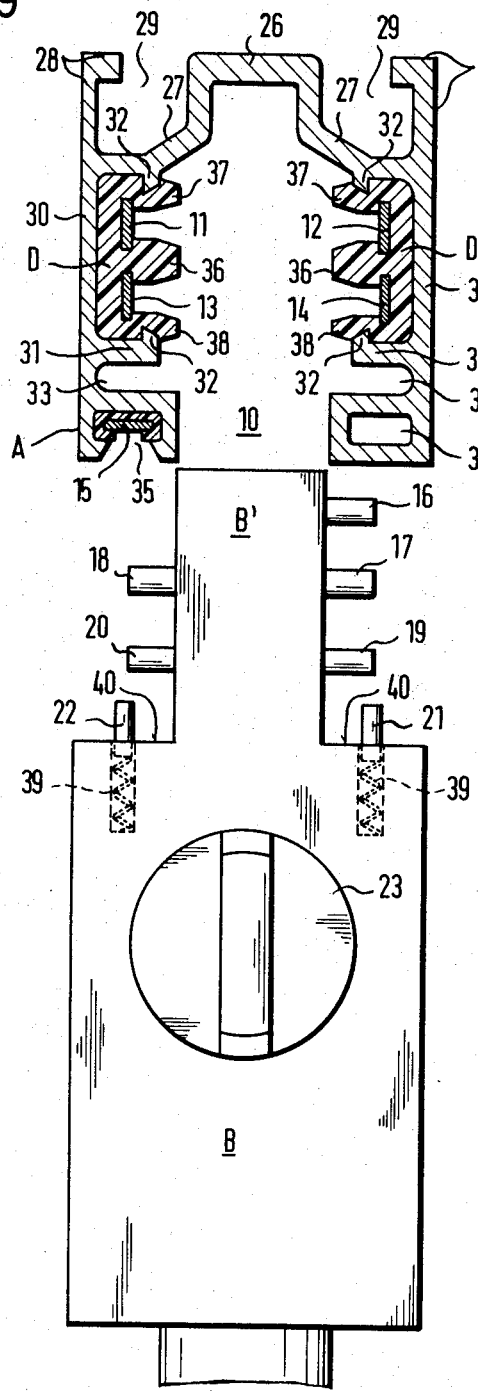
FIG. 9 is a section for the use position shown in FIG. 7, whereby again the support rail and the terminal box are shown in the non-coupled state in superposed position.

In the manner of use indicated to FIGS. 7 to 9, the pole tongue 16 with the pole rail 12 cooperates, as shown in the drawings on the right side, of the support rail A, whereby the pole rail 12 and the zero conduit rail 14 form in this case a joint circuit. This position is obtained, if the terminal box is inserted turned 180° about the longitudinal center axis extending from the illumination device terminal end to the head end. In this application the grounding pin 22 cooperates with the grounding rail 15. The grounding pin 21 is disposed thereby inside of the terminal box.

It is pointed out that in the insert position in accordance with FIGS. 6 and 9 the tongues 16 to 20 are disposed normally inside of the head part B'. They are, however, shown for a better understanding in their extended position.

It is to be understood finally that the shown example and the described examples are to be considered merely as possible embodiments. Rather within the frame work of the invention other design of the support rail as well as of the conduit rail received in a conduit rail carrier of insulating material, as well as the design and arrangement of the contact tongues on the side of the terminal box, are possible.

While we have disclosed several embodiments of the present invention it is to be understood that these embodiments are given by example only and not in a limiting sense.

We claim:
1. An illumination device, comprising
   a support rail adapted to be secured in, on, or at a distance from a securing face and open towards one side defining a receiving channel, said receiving channel receiving inside thereof on both sides a conduit rail carrier having therein a plurality of electrical conduit rails, said conduit rails being accessible from the inside of said receiving chamber and disposed in planes in pairs, mirror-symmetrically to a longitudinal center plane arranged from an insert side to a securing side of said support rail, and in superposition, a terminal box having a set-off head part insertable into said receiving channel of said support rail and carrying lighting units, said terminal box being equipped with a plurality of spring tongues constituting holding tongues and contact tongues and with spring-biased grounding pins in said head part cooperating with a separate grounding rail disposed on said support rail, said spring tongues being disposed in superposed planes, and being switchable selectively into an engaging and contact position, respectively, or into an inoperative position, each of said conduit rails having a flat rectangular cross section, said support rails including holding nose recesses, said conduit rail carriers formed each as a multi-tooth comb profile embedded approximately over the total width of the cross-section into said support rail, said conduit rail carriers being retained in said holding nose recesses of said support rail as independent structural units with said conduit rails therein, in each of said conduit rail carriers said conduit rails constituting each a pole conduit and a zero conduit of a current circuit of each conduit rail carrier being individually and independently switchable and/or controllable from each other, said contact tongue of said terminal box including a pair of zero conduit tongues cooperating with said zero conduit in both of said conduit rail carriers and correspondingly disposed on said terminal box, and including a single pole contact tongue disposed corresponding to the position of said pole conduit, said pole contact tongue cooperating in one insert position of said terminal box with a pole conduit of one current circuit of one of said conduit rail carriers on one side of said receiving channel of said support rail, and said pole contact tongue, in another insert position of said terminal box, in which the latter is insertable turned about 180° into said receiving channel relative to said one insert position, cooperating with the pole conduit of the other current circuit of the other of said conduit rail carriers on the other side of said receiving channel of said support rail, said terminal box having in each insert position one of said spring biased grounding pins performing a grounding connection with said separate grounding rail on said support rail, said grounding pins being disposed on set-off steps respectively formed on said terminal box on both sides adjacent said head part, one of said grounding pins on one of said set off steps in each insert position of said terminal box always cooperating on a bottom side of said support rail in a contacting manner with said grounding rail, the latter disposed insulatingly in a longitudinal channel formed in said bottom side of said support rail, while the other of said grounding pin on the opposite side set-off step being free from said grounding rail and being pressed against the pressure of a biasing spring acting therein in a pin recess formed in the corresponding set-off step of said terminal box into said pin recess, and support rail securing means being arranged on the upper side of said support rail for a direct securing of said support rail with support rail securers and hook stays for an indirect securing of said support rail with profiled suspension rails, and said securing means and said hook stays defining planes on a common level.

2. The illumination device, as set forth in claim 1, wherein said support rail securing means comprises a center centrally disposed stay bridging over the upper side of said receiving channel, said center stay extends from the center of said support rail over part of the width of said support rail and is thereafter angularly bent downwardly in the direction towards the insert side of said receiving channel, and connecting stay sections between and on both sides of said center stay and said hook stays, the latter each advanced again to the height of said center stay, whereby between each of said hook stays and said center stay, a longitudinal channel is formed open towards the securing face.

3. The illumination device, as set forth in claim 1, which includes a air each of stop noses projecting into said receiving channel defining said holding nose recesses for holding said conduit rail carriers therein within the inside of said support rail on each side spaced apart from each other.

4. The illumination device, as set forth in claim 1, wherein said support rail defines at its profile a longitudinally extending hollow chamber each at its lower end adjacent both sides respectively of said receiving channel, one of said hollow chambers is formed as a groove open at one side at its bottom, a grounding rail carrier, carrying said grounding rail disposed in said one hollow chamber, the other of said hollow chambers is formed as a chamber closed all around in its cross section and only having break-throughs towards said receiving channel, and longitudinal recesses in said support rail above said hollow chambers for reception of said holding tongues of said terminal box.

5. The illumination device, as set forth in claim 1, wherein each of said conduit rail carriers comprises a three-tooth comb-profile of substantially E-shape, the teeth being reduced towards their free ends and conduit rail carriers are retained exclusively within the range of both outer teeth, formed as securing teeth, near their free ends with a stop nose securing means, said flat rectangular conduit rails are embedded within the range between the center tooth of said conduit rail carriers and both outer teeth such, that a portion of said conduit rails remains uncovered as a contact area, corresponding to the spacing between said teeth.

6. The illumination device, as set forth in claim 1, wherein
said conduit rails are disposed within said conduit rail carriers at a distance from the ends of said conduit rail carriers assuring a touching protection.

* * * * *